Aug. 4, 1953
R. A. CHRISTIAN ET AL
2,647,688
SYMBOL PRINTING MECHANISM FOR ACCOUNTING MACHINES
Original Filed Dec. 6, 1947
10 Sheets-Sheet 2
FIG. 3
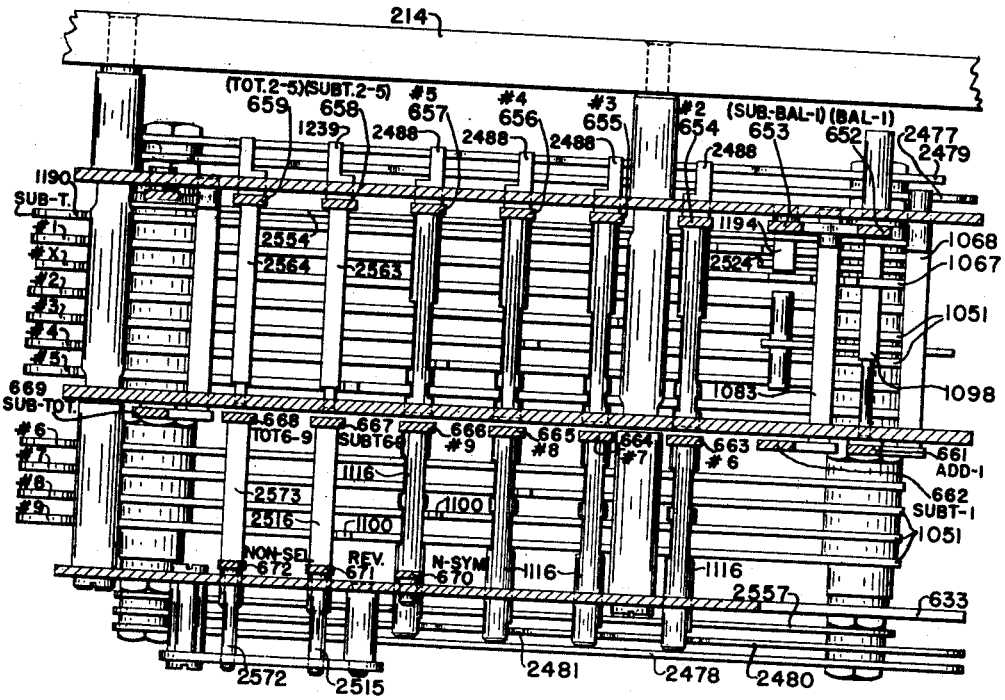
FIG. 4
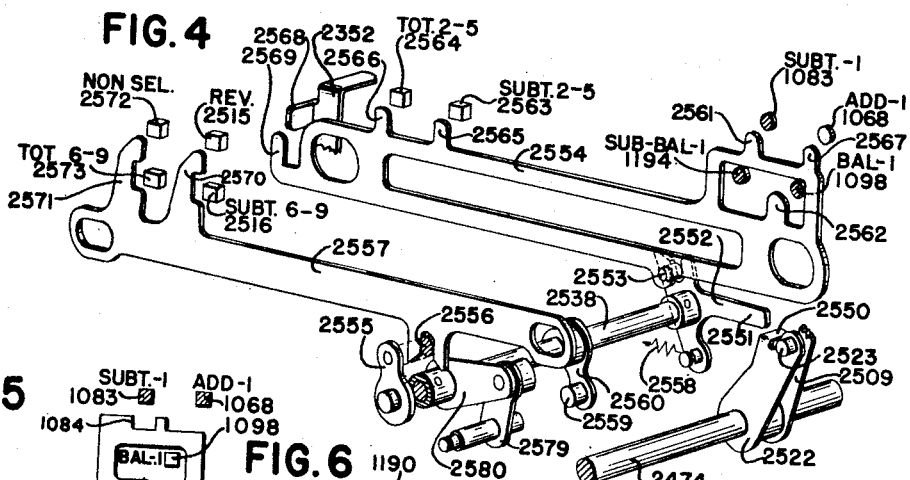
FIG. 5
FIG. 6
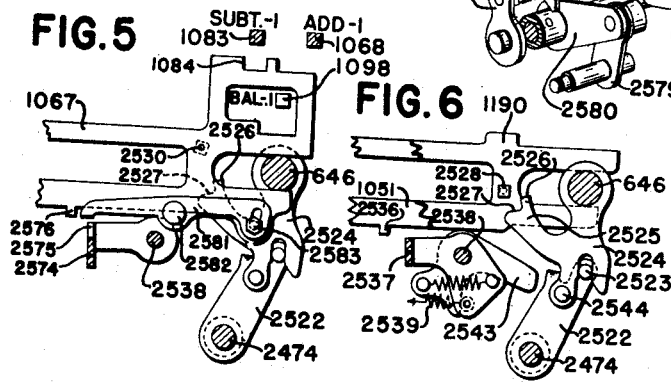
INVENTORS
RAYMOND A. CHRISTIAN
ANDREW J. STRACHAN
& PAUL H. WILLIAMS
BY
THEIR ATTORNEYS Aug. 4, 1953
R. A. CHRISTIAN ET AL
2,647,688
SYMBOL PRINTING MECHANISM FOR ACCOUNTING MACHINES
Original Filed Dec. 6, 1947
10 Sheets-Sheet 3
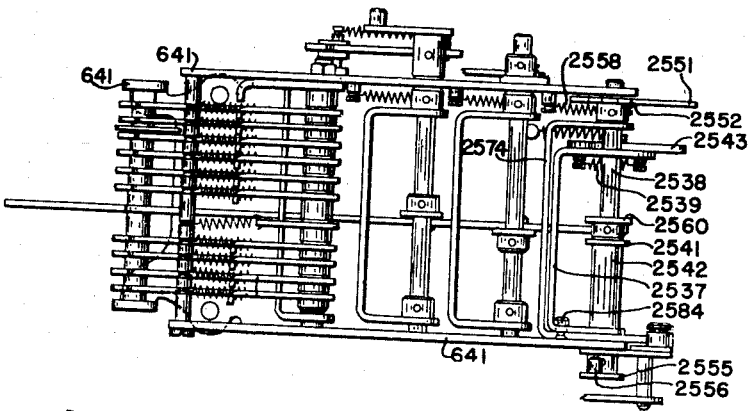
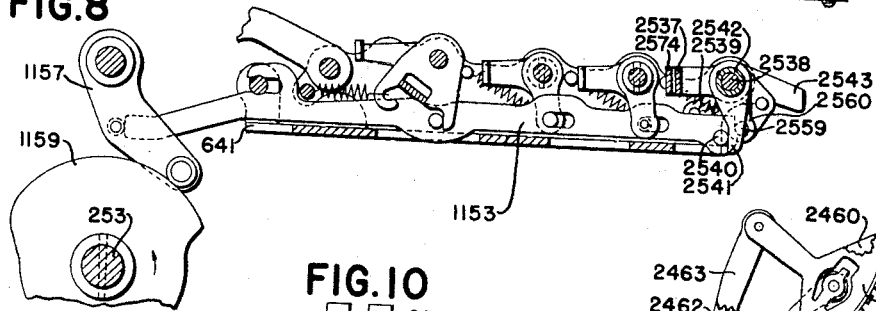
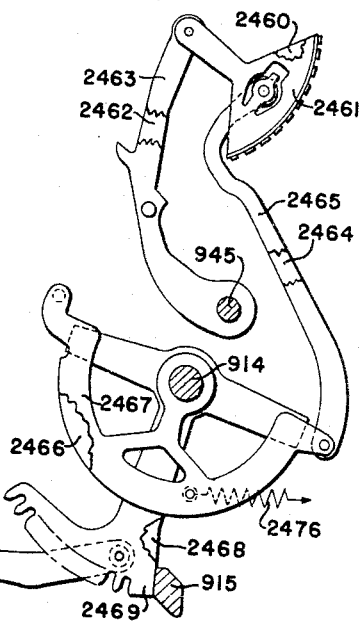
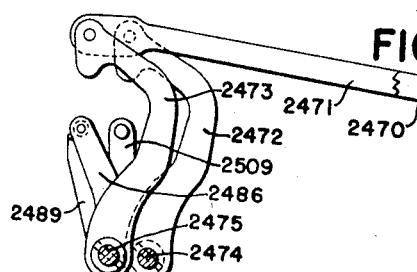
INVENTORS
RAYMOND A. CHRISTIAN
ANDREW J. STRACHAN
& PAUL H. WILLIAMS
BY Carl Beust
Richard Van Buren
THEIR ATTORNEYS Aug. 4, 1953 R. A. CHRISTIAN ET AL 2,647,688
SYMBOL PRINTING MECHANISM FOR ACCOUNTING MACHINES
Original Filed Dec. 6, 1947 10 Sheets-Sheet 4
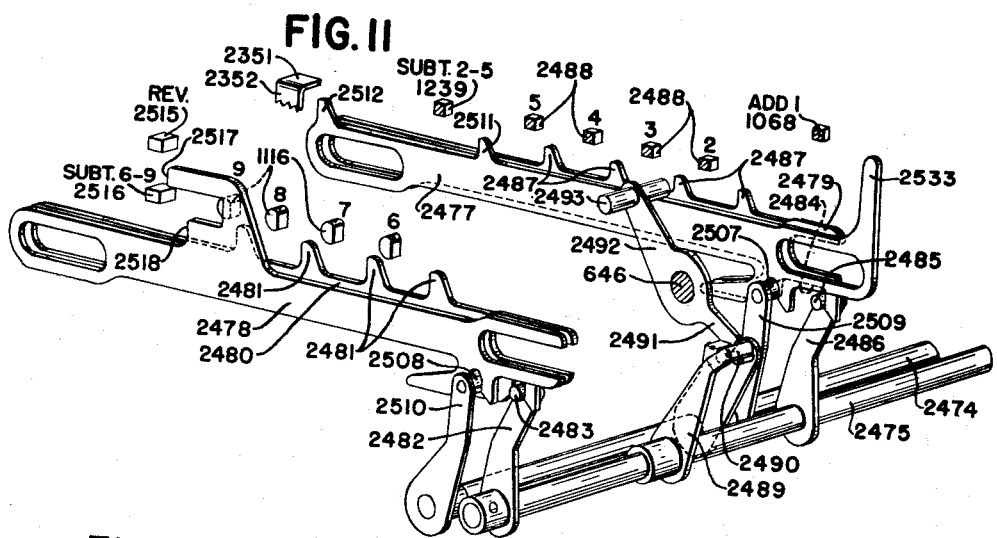
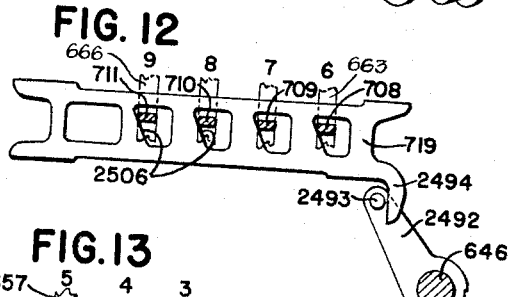
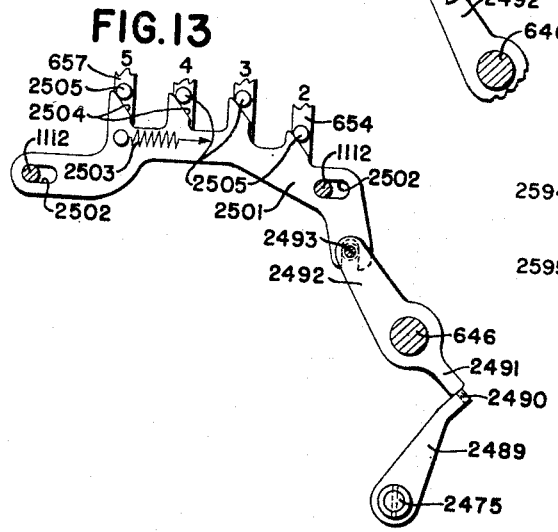
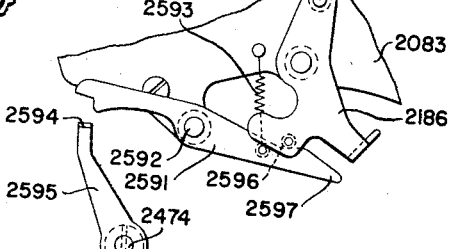
INVENTORS
RAYMOND A. CHRISTIAN
ANDREW J. STRACHAN
& PAUL H. WILLIAMS
BY Earl Beust
Richard Van Buren
THEIR ATTORNEYS Aug. 4, 1953  R. A. CHRISTIAN ET AL  2,647,688
SYMBOL PRINTING MECHANISM FOR ACCOUNTING MACHINES
Original Filed Dec. 6, 1947  10 Sheets-Sheet 7

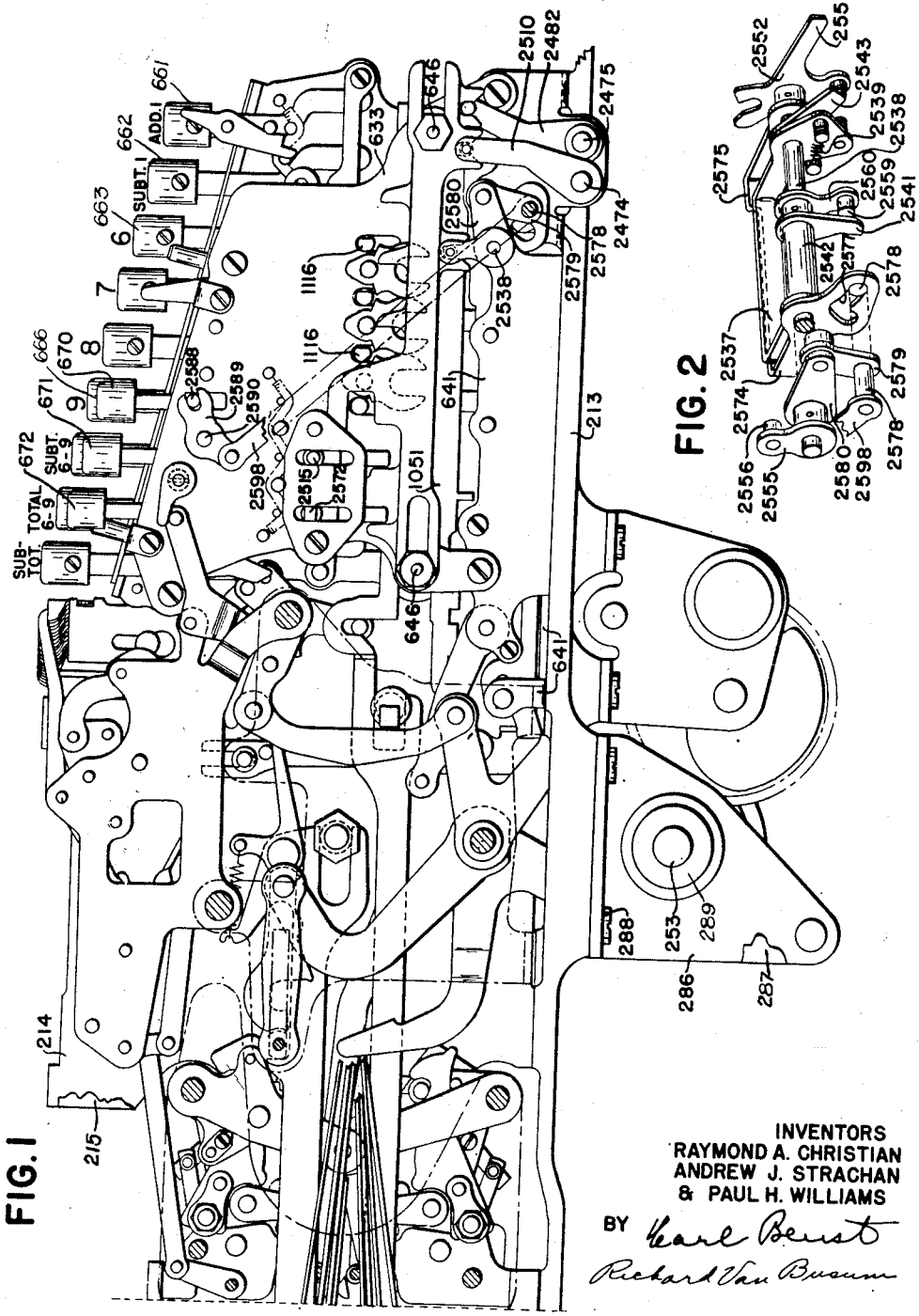

INVENTORS
RAYMOND A. CHRISTIAN
ANDREW J. STRACHAN
& PAUL H. WILLIAMS
BY
THEIR ATTORNEYS

Aug. 4, 1953        R. A. CHRISTIAN ET AL        2,647,688
SYMBOL PRINTING MECHANISM FOR ACCOUNTING MACHINES
Original Filed Dec. 6, 1947
10 Sheets-Sheet 8

INVENTORS
RAYMOND A. CHRISTIAN
ANDREW J. STRACHAN
& PAUL H. WILLIAMS

BY

THEIR ATTORNEYS

Aug. 4, 1953 R. A. CHRISTIAN ET AL 2,647,688
SYMBOL PRINTING MECHANISM FOR ACCOUNTING MACHINES
Original Filed Dec. 6, 1947
10 Sheets—Sheet 10

INVENTORS
RAYMOND A. CHRISTIAN
ANDREW J. STRACHAN
& PAUL H. WILLIAMS
BY Carl Beust
Richard Van Braun

THEIR ATTORNEYS

Patented Aug. 4, 1953

2,647,688

UNITED STATES PATENT OFFICE 2,647,688

SYMBOL PRINTING MECHANISM FOR ACCOUNTING MACHINES

Raymond A. Christian, Andrew J. Strachan, and Paul H. Williams, Dayton, Ohio, assignors to The National Cash Register Company, Dayton, Ohio, a corporation of Maryland Original application December 6, 1947, Serial No. 790,032. Divided and this application May 9, 1951, Serial No. 225,313

12 Claims. (Cl. 235—60.18)

The present invention relates to calculating machines and particularly to machines of the accounting or bookkeeping type which are provided with a traveling paper carriage for supporting the bookkeeping forms and also for automatically controlling the various functions of the machine in accordance with the columnar positioning thereof.

This application is a division of the application for United States Letters Patent Serial No. 790,032, filed on December 6, 1947, by Raymond A. Christian et al., which issued into Patent No. 2,626,749, January 27, 1953.

In the business world of today, there are nearly as many different types of bookkeeping systems employed as there are separate business organizations. It has, therefore, been necessary for the builders of bookkeeping or accounting machines to modify the designs of their machines frequently in order to adapt them to the particular bookkeeping system employed by the prospective purchaser. These so-called "customer order" machines are costly to build, since certain portions of the machines must be practically handmade in order to furnish a machine having the desired characteristics.

Accordingly, it is an object of the present invention to provide a solution to this problem of adapting a particular type of accounting machine to fit the bookkeeping system utilized by any particular customer. This has been done in the present instance by designing an accounting or bookkeeping machine which is sufficiently flexible in character that it may be used in connection with practically any of the complex accounting systems used by present-day business establishments.

Another problem confronting both the manufacturers and the users of accounting machines is the complexity of many of our present bookkeeping systems. Not only is it difficult to construct machines which are capable of performing the many and complicated operations involved, but it is also difficult for the operator of the machine to learn how to manipulate the various controls of the machine so as to properly perform the various operations involved in making an entry on the books. It is, therefore, a further object of the invention to provide a bookkeeping machine which will perform most of these operations automatically and therefore require a minimum amount of time and attention on the part of the operator of the machine.

In order to better enable the machine embodying the present invention to handle the complicated present-day bookkeeping procedures, it is provided with a large number of totalizers which may be selected simultaneously in various combinations for either addition or subtraction, so as to enable postings to be made into a large number of separate accounts during a single machine cycle.

A further object of the invention resides in the provision of a simplified type of front-feed paper carriage. This carriage is driven in both its forward direction and its reverse direction by a hydraulic drive mechanism which is operated by the same motor which serves to drive the main operating mechanism of the machine.

Still another object of the invention is to provide certain novel key mechanisms whereby the operator may control the functioning of the machine in a desired manner.

Another object of the invention is to provide a novel mechanism for printing function-identifying symbols after the various numerical entries, together with means for enabling this mechanism to be disabled at the option of the operator under certain conditions.

A further object of the invention resides in the provision of the various interlocks and control devices which are necessary in order to insure the proper operation of the machine and its various component mechanisms despite the inexpert handling thereof by an unskilled operator.

With these and other objects in view which will become apparent from the following description, the invention includes certain novel features of design and combinations of parts, a preferred form or embodiment of which is hereinafter described with reference to the drawings which accompany and form a part of this specification.

In the drawings:

Figure 1 is a left side elevation of the front portion of the present machine.

Figure 2 is a perspective view of certain of the mechanism controlled by the "Non-symbol" key for preventing the printing of symbols under certain conditions.

Figure 3 is a plan view showing the totalizer control slides and the symbol-printing control slides, together with the studs on the control keys which cooperate with these slides.

Figure 4 is a perspective view of the two enabling slides associated with the symbol-printing mechanism.

Figure 5 is a fragmentary view showing the forward end of the No. 1 totalizer slide and certain of the symbol-printing control mechanism cooperating therewith.

Figure 6 is a fragmentary view showing the forward end of the sub-total slide and certain of the symbol-printing control mechanism cooperating therewith.

Figure 7 is a plan view of the devices used for sensing the lower edges of the totalizer control slides to thereby control certain functions of the machine.

Figure 8 is a left side elevation of the mechanism shown in the preceding figure.

Figure 9 is a view of a portion of the symbol-printing mechanism as viewed from the right-hand side of the machine.

Figure 10 is a diagrammatic view of the various symbols on the symbol type sectors.

Figure 11 is a perspective view showing the symbol-printing control slides and certain of the mechanism connected therewith.

Figure 12 is a left side view showing the control exercised by the center bank of function control keys over the symbol-printing mechanism.

Figure 13 is a left side view illustrating the control exercised by the right-hand bank of function control keys over the symbol-printing mechanism.

Figure 14 is a right side elevation showing the mechanism for controlling the movement of the symbol-printing sector to printing position.

General description

Certain of the principles and features of the machine hereinafter to be described are disclosed in the following United States Patents: 1,197,276, September 5, 1916, Halcolm Ellis; 1,203,863, November 7, 1916, Halcolm Ellis; 1,819,084, August 18, 1931, Emil John Ens; 2,038,717, April 28, 1936, Raymond A. Christian; 2,079,355, May 4, 1937, Charles L. Lee; 2,181,975, December 5, 1939, Charles L. Lee; 2,189,851, February 13, 1940, Paul H. Williams et al.; 2,217,221, October 8, 1940, Jesse R. Ganger; 2,243,806, May 27, 1941, Laurence N. Lehman; 2,316,520, April 13, 1943, Henry F. Lang; and 2,442,402, June 1, 1948, John T. Davidson et al.

The basic structure of the present machine is patterned after the machine shown in the foregoing patents, which has been on the market for many years. For example, the construction and arrangement of the keyboard, the differential actuators, the printer, and the totalizers are practically identical with the corresponding mechanisms shown in the patents. The basic structure of the prior art machine is disclosed in the Ellis Patent No. 1,197,276, while an add-subtract totalizer of the same general type as that used in the present machine is disclosed in Ellis Patent No. 1,203,863. The totalizer engaging and disengaging mechanism, on the other hand, is shown in the above-mentioned Patent No. 2,442,402. Most of the mechanisms for controlling the various machine functions, however, are new in the subject machine, as are also the paper carriage and the controlling mechanisms therefor. In addition, the instant machine is equipped with an electric typewriter which is driven by the same motor that operates the remainder of the machine. With this brief, overall description in mind, the various parts of the machine will now be described in detail, so as to provide a full and complete understanding of the entire device.

Figure 15:
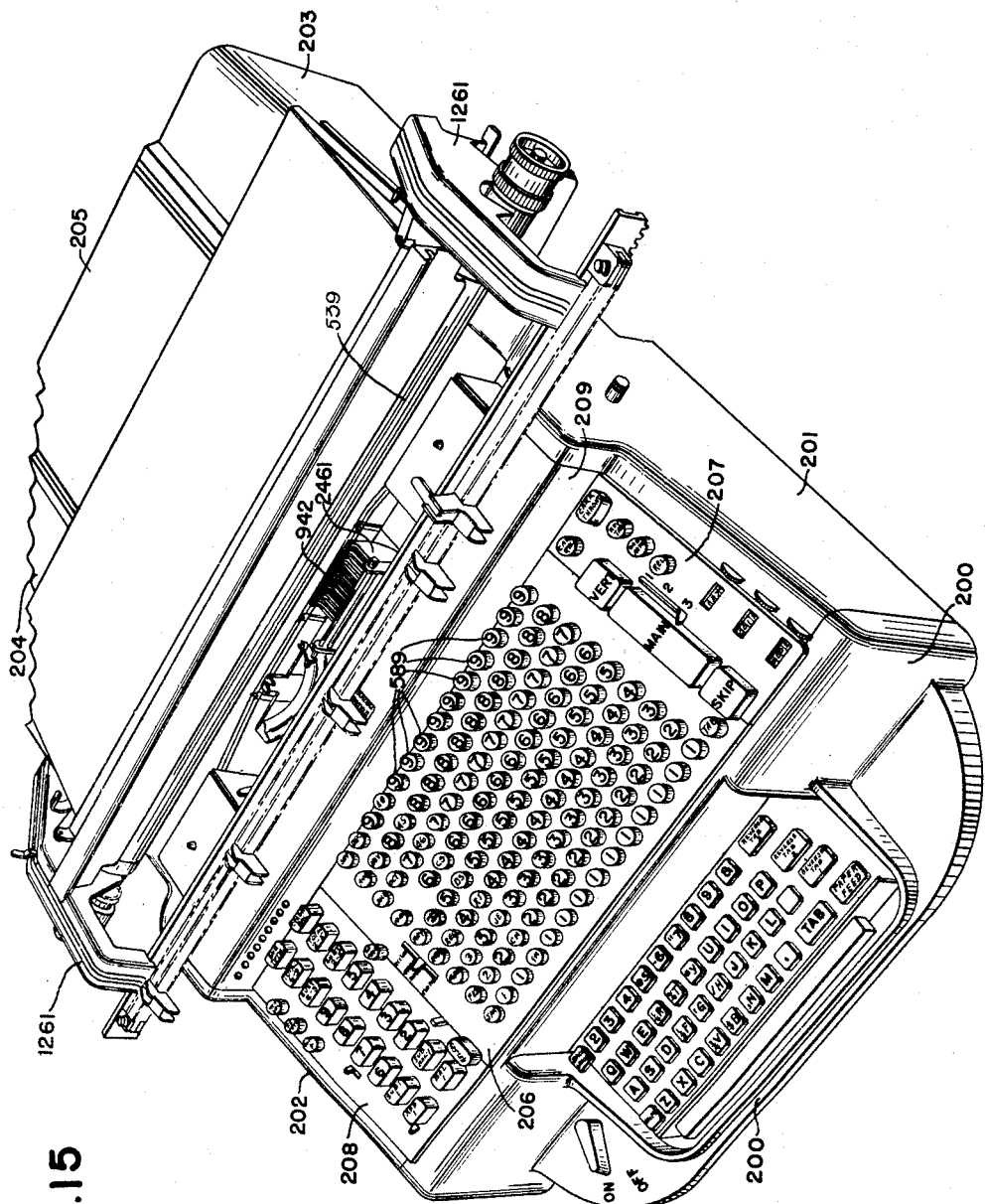
Figure 15 is a perspective view of the complete machine.

General organization and cabinet (Figure 15)

A perspective view of the machine as a whole is shown in Figure 15 of the drawings, and a general understanding of the layout and organization of the machine may be obtained from this illustration. As shown herein, a typewriter keyboard is located at the front end of the machine, while just behind and somewhat above this keyboard is an amount keyboard on which may be set up the various amounts which are to be entered in the accounting machine. To the left of the amount keyboard is a control keyboard containing the various function control keys, while to the right of it are located a plurality of motor bars and carriage control keys. In the center, just above the amount keyboard, are a group of type sectors for the accounting machine, while just to the left of these sectors is located a type basket for the electric typewriter.

Immediately behind the aforementioned printing mechanism is a rotatable platen in which accounting forms and/or other record material may be supported, this platen being mounted on a traveling carriage which is movable back and forth across the machine. Behind the paper carriage is shown that part of the machine cabinet which houses the add-subtract totalizers. At the front of the machine, just to the left of the typewriter keyboard, is a switch lever for starting and stopping a continuously-running electric motor, which drives the various operating mechanisms of the machine.

As shown in Figure 15, the operating mechanism of the machine is housed in a cabinet made up of several separate sections, each of which is independently removable in order to yield access to the part of the machine lying thereunder. This cabinet is composed of a front piece 200, extending across the front of the machine and having a central opening therein for accommodating the keys of the typewriter mechanism. Located on either side of the machine are side plates 201 and 202, immediately behind which are located additional side plates 203 and 204, which cover the sides and part of the top of the totalizer section of the machine. The top of the totalizer section is further covered by a plate 205, which also extends down over the rear end thereof and, together with similar downwardly-extending portions on side pieces 203 and 204, serves to cover the rear of the machine.

The thus-constituted accounting machine cabinet is further complemented by keyboard cover plates 206, 207, and 208, which are provided with apertures through which extend the upper ends of barrel-type key caps. To the rear of the keyboard and extending across the machine between the side pieces 201 and 202 is an angular strip of metal 209, which encloses a carriage control mechanism which will be described in detail in a subsequent portion of this description.

*Framework*

Figure 17:
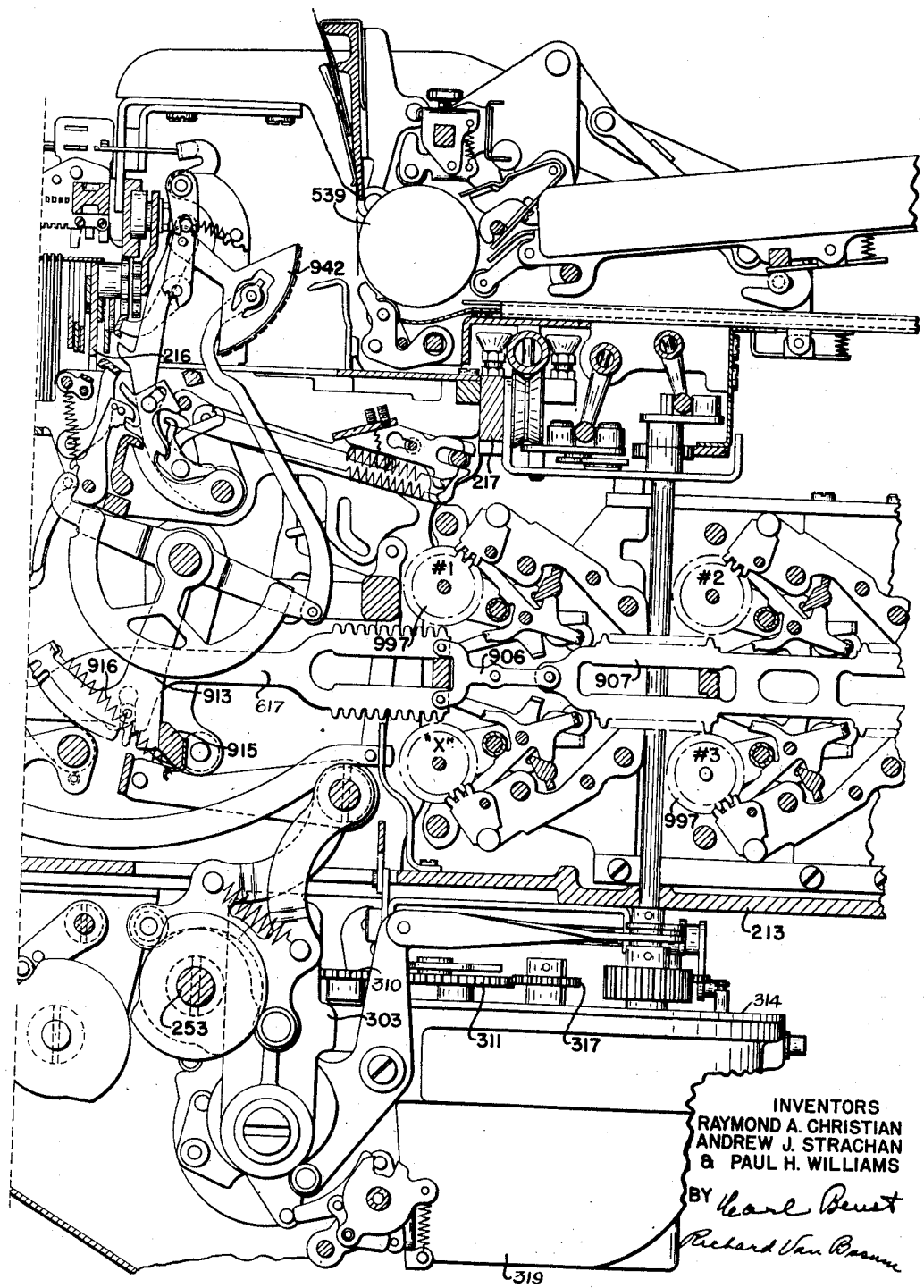
Figure 17 is a fragmentary longitudinal sectional view of the rear portion of the machine, taken just to the right of one of the amount banks.

The principal element of the machine frame is a cast-iron base 213 (Figures 1 and 17), which supports, either directly or indirectly, all of the various mechanisms going to make up the present machine. This base is generally rectangular in shape and is provided with various ribs, pads, bosses, and cut-outs for accommodating all of the various structures supported thereon or depending therefrom. Mounted on top of the base toward the front of the machine are a left side frame 214 and a right side frame 215. Extending between the upper portion of the side frames and connected thereto is an angle bar 216, which serves to support the forward part of the carriage as well as the carriage control mechanisms cooperating therewith. Located behind the angle bar 216 and supported by the side frames is a rail 217 for supporting the rearward portion of the carriage. The angle bar 216 is secured to the side frames 214 and 215, and the rail 217 is secured to the side frames by screws (not shown). The base, the side frames, and the cross pieces for supporting the carriage constitute the main framework of the machine, although there are, of course, numerous sub-frames secured in one way or another to these main frame elements for supporting the various operating mechanisms of the machine. These sub-frames will be described in connection with the mechanisms which they support as the description proceeds.

*Motor drive*

The various operating mechanisms of the present machine are driven by an electric motor 220 (Figure 18) secured to the under side of the base 213. As previously mentioned herein, the motor is adapted to operate continuously while the machine is in use and may be turned on or off by means of a single-pole, single-throw toggle switch (Figure 15), which may be operated from the front of the machine by means of a lever 222 operably connected therewith. A speed control device or governor (not shown) is provided on the rear end of the motor shaft for the purpose of maintaining the speed of the motor essentially constant under the varying load encountered in this type of service. On the front end of the motor shaft 223 (Figure 18) is secured a worm 224, which meshes with a worm wheel 225 pinned to a shaft 226, which is journaled at either end on bearings (not shown) provided in the side walls of a gear casing 227, which is secured by bolts 228 (only one shown) to the frame of the motor 220 and by other bolts 229 (only one shown in Figure 18) to the under side of the base 213. Hence, whenever the motor is running, the shaft 226 will be driven at a reduced rate of speed through the worm 224 and the worm wheel 225. Pinned to the right end of the shaft 226 is a spur gear 240 (Figures 18 and 19), which meshes with two other spur gears 241 and 242. The gear 241 is secured to a sleeve 243, which is rotatably journaled on a long stud mounted in the right-hand side of the gear casing 227.

As previously mentioned, the gear 240 meshes with the gear 242, which is resiliently secured to a notched wheel 250 (Figure 19) by means of a rubber ring (not shown), which is bonded to the gear 242 and also to a metal ring (not shown) secured to said wheel 250. The wheel 250 is rotatably mounted on a main cam shaft 253.

The gear 242 and the notched wheel 250 may be engaged with the main cam shaft 253 so as to cause the shaft to be given cycles of operation. The means for engaging the gear and the wheel with the shaft 253 comprises a disc 255 (Figure 19) having a stepped hub 256, which is pinned to the shaft 253. Loosely mounted on the step of the hub 256 is a clutch control arm 257, which is urged in a clockwise direction on the hub 256 by a spring 258 connected between the arm and the disc 255. The arm 257 is normally prevented from clockwise rotation under the influence of the spring 258 by a tripping arm 259, the end of which cooperates with an extension 260 of the arm 257. The tripping arm 259 is secured to the left-hand end of a short shaft 271, which is rotatably mounted in the machine frame and may be caused to rotate in a clockwise direction, so as to release the arm 257 to the influence of the spring 258, under the control of the several motor or starting bars of the machine and certain other machine operation control mechanisms.

The upper portion of the arm 257 (Figure 19) is provided with gear teeth 272, which mesh with corresponding gear teeth formed on a headed portion 273 of a clutch dog 274 journaled in the disc 255 near its periphery. The dog 274 passes through the disc 255 and projects into the path of a series of notches 275 around the periphery of the wheel 250. The under side of the dog is flattened so that it will clear the wheel and the notches when the dog is in the position shown in Figure 19. However, when the tripping arm 259 is moved away from the extension 260, the arm 257 will be rotated clockwise under the influence of the spring 258, and the dog 274 will be rotated counter-clockwise so as to cause the left-hand edge of the stud to engage with one of the notches 275 of the constantly rotating wheel 250, thereby causing the disc 255 and the main cam shaft 253 to be rotated clockwise as viewed in Figure 19. The clutch control arm 257 is limited in its movement on the hub 256 by shoulders 276 on the arm 257, which shoulders cooperate with the sides of the headed portion 273 formed on the clutch dog 274. In order to brace the clutch dog 274, its upper half is surrounded by a bushing 277, which is secured to the disc 255.

Secured to the right-hand end of the shaft 271 is a two-armed lever 278, the rearwardly-extending arm 279 of which is provided with a roll (not shown) and the forwardly-extending arm of which is bifurcated and engages a stud 280 in the lower end of a lever 281. The lever 281 is secured to the right-hand end of a shaft 282 journaled at one end in the side frame 215 and at the other end in a vertical bracket (not shown), which is spaced from the right of the side frame 215 and secured to the base 213 by screws passing through bent-over feet thereon. The lever 281 and the shaft 282 are urged counter-clockwise by a spring 285 stretched between a stud in the lever 281 and a stud mounted in the side frame 215. Hence, the spring 285 constantly tends to move the tripping arm 259 clockwise out of engagement with the extension 260, so as to engage the clutch and cause the main cam shaft 253 to be rotated clockwise, as viewed from the right-hand side of the machine.

The main cam shaft 253 extends transversely across the machine beneath the base 213 (Figures 1 and 17) and is journaled at either end in roller bearings 289, which are mounted in brackets 286 and 287 secured to the under side of the base by screws 288.

The cam shaft 253 has secured thereto a large number of cams for controlling various machine functions in a manner to be more fully described later herein. Secured to a sleeve near the right-hand end of the cam shaft is a tripping arm restoring cam (not shown), which normally rotates in unison with the cam shaft 253, said cam being provided with a lobe which engages the roll on the extension 279 of the lever 278 (Figure 19) at the end of one revolution of the cam shaft 253 to thereby rotate the shaft 271 counterclockwise and move the tripping arm 259 back into the path of the extension 260 on the clutch control arm and so cause the clutch to be disengaged. The shaft 271 and the arm 259 are retained in their restored positions, against the urgency of the spring 285, by a mechanism which will be described later herein in connection with the motor bars of the machine.

Figure 19:
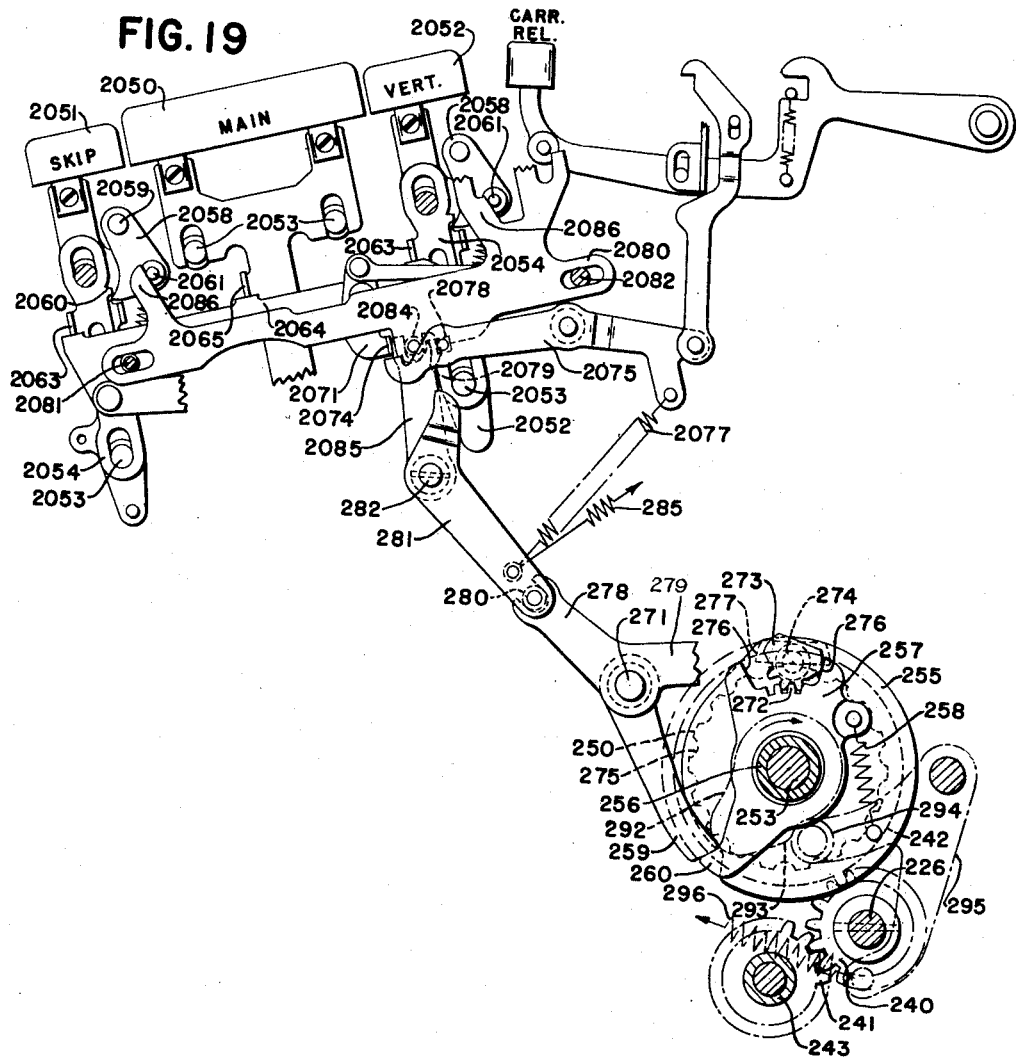
Figure 19 is a right side view showing in detail the construction of the cycle-initiating or starting mechanism.

In order to insure that the main cam shaft will complete its movement into its home position after the clutch has been disengaged, a homing cam 292 is secured to the cam shaft 253 (Figure 19) and is provided with a camming face 293, which cooperates with a roller 294 mounted on a pivoted lever 295, which is biased by a strong spring 296 in such a direction as to press the roller against the camming face 293 and thereby rotate the shaft 253 into its home position, as shown in Figure 19, where the roller seats itself in a slight depression formed in the face of the cam.

It will be noted from the foregoing description that the cam shaft 253 will be positively driven by the electric motor 220 through one revolution in a clockwise direction (as viewed from the right-hand side of the machine) each time the clutch is engaged.

Figure 18:
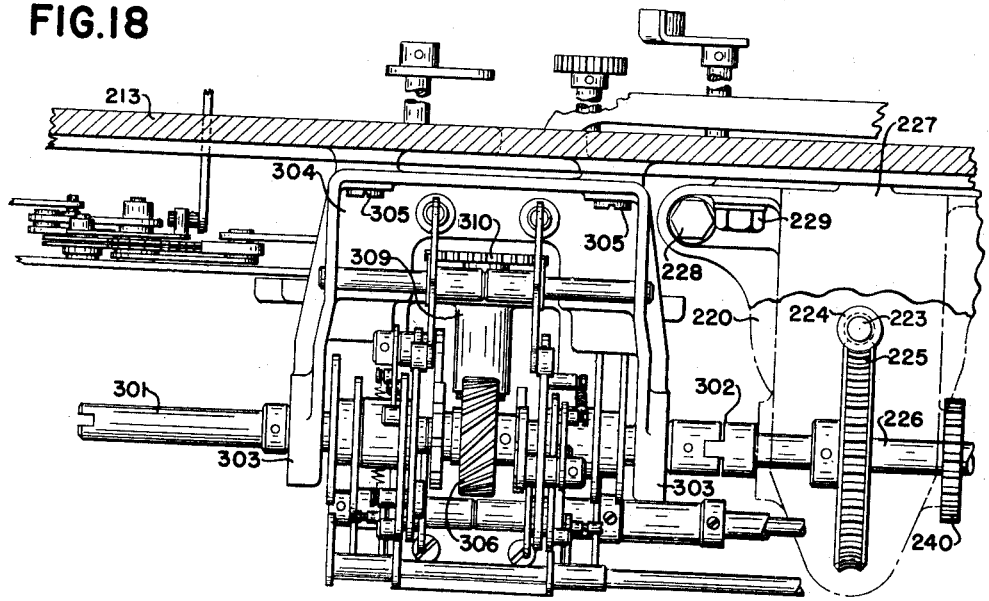
Figure 18 is a front view of a portion of the motor drive mechanism for the machine.

Referring now to Figure 18, a shaft 301 is coupled at 302 to the shaft 226 driven by the motor 220. The shaft 301 is journaled in a pair of downwardly-extending legs 303 of a casting 304 secured to the under side of the base 213 by screws 305. Located on the shaft 301 approximately midway between the legs 303 is a helical gear 306, which meshes with another helical gear pinned to the lower end of a vertical shaft (not shown) journaled in a boss 309 formed integrally with the casting 304. Secured to the upper end of the vertical shaft is a spur gear 310, which meshes with a gear 311 (Figure 17) secured to the upper end of a stub shaft journaled in a bushing extending between a cover plate 314 for a fluid clutch or hydraulic drive mechanism 319 and an auxiliary plate (not shown) suspended from said cover plate 314 by means of hanger studs (not shown). Meshing with the gear 311 is a small gear 317, which is pinned to the upper end of a vertical shaft (not shown) which drives one member of the fluid clutch 319. A reversible gear mechanism connects the other member of the fluid clutch to the traveling carriage to resiliently drive said carriage in forward and reverse tabulating directions.

*Motor bars*

Figure 20:
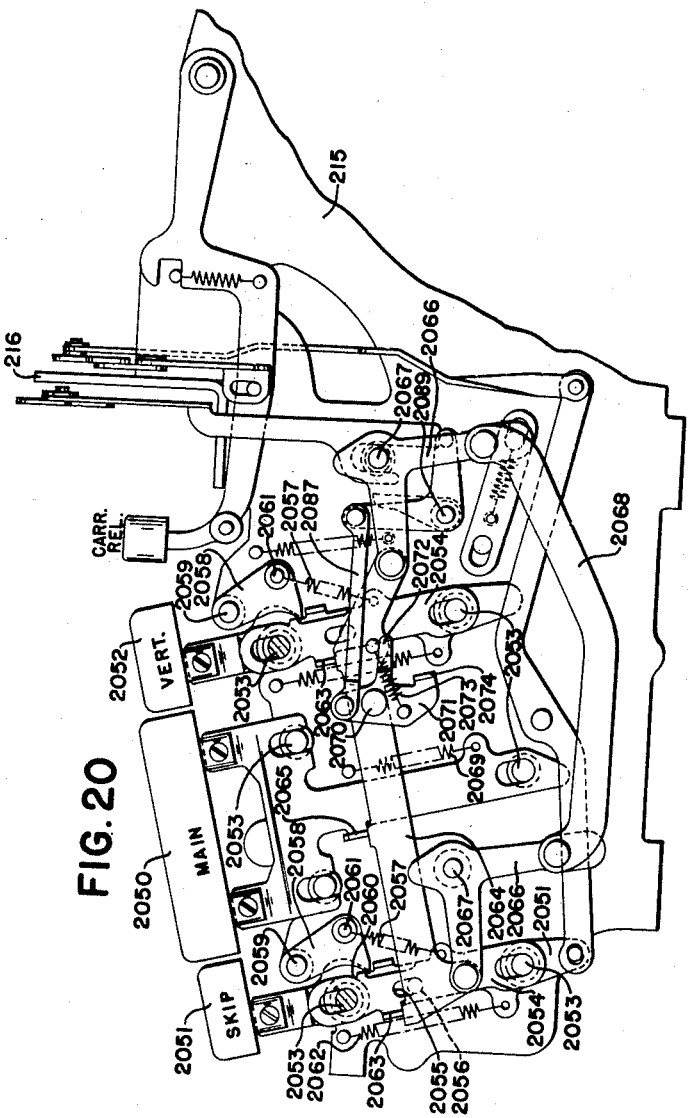
Figure 20 is a right side elevation of the various motor bars and further details of the cycle-initiating mechanism associated therewith.

As mentioned earlier herein, the present machine is provided with a plurality of motor bars located on the right-hand side of the keyboard, which serve to initiate operations of the machine and also to control certain functions thereof. The mechanism controlled by the several motor bars for causing the main clutch to be engaged and the machine to be operated is shown in Figures 19 and 20. As shown in these figures, the machine is provided with a "Main" motor bar 2050, a "Skip" motor bar 2051, and a "Vertical" motor bar 2052, which motor bars are slidably mounted on studs 2053 secured to the right side frame 215. In the case of the motor bars 2051 and 2052, an auxiliary slide 2054 is slidably mounted on the studs 2053 adjacent to the stems of the motor bars. Each slide is provided with a vertical slot 2055, which cooperates with a stud 2056 secured in the stem of the associated motor bar 2051 or 2052. Each slide is normally maintained in its raised position with the stud 2056 seated in the lower end of the slot 2055 by means of a spring 2057 stretched between the slide and a stud 2061 secured to a latch 2058 pivotally mounted on a stud 2059 secured to the right side frame. In each instance, the latch 2058 is adapted to cooperate with a notch 2060 formed in the edges of the slides to thereby retain the latter in their lower positions whenever their associated motor bars are manipulated. Hence, depression of either of the motor bars 2051 or 2052 will cause the slides associated therewith to be carried down and retained by the latches 2058, while the motor bars themselves will be permitted to return to their raised or normal positions by means of restoring springs 2062.

Each slide 2054 is provided with a formed-over ear 2063, which engages with a finished pad formed on the top edge of a substantially horizontal link 2064. Similarly, the main motor bar 2050 is provided with a formed-over ear 2065, which engages with another finished pad on the upper edge of the link 2064. The link 2064 is carried by a pair of bell crank levers 2066, which are pivotally mounted on studs 2067 secured to the side frame 215. As shown in the drawings, the link is pivotally connected at either end to one of the horizontally-extending arms of the bell crank levers, while the depending arms of these levers are connected together by a link 2068, thereby causing parallel movement of the link 2064.

Mounted on the link 2064 is a stud 2070, on which is pivotally mounted a pressure arm 2071, which is provided with a finger 2072, which is urged into engagement with a spring stud mounted on the link 2064 by a spring 2073. The pressure arm 2071 is provided with a bent-over ear 2074 (Figures 19 and 20), which lies above the left-hand end of a lever 2075 pivotally mounted on a stationary stud 2076, said lever being urged clockwise about the stud by a spring 2077. The lever 2075 carries a square stud 2078, which cooperates with a notch 2079 formed in the lower edge of a clutch control slide 2080 supported for horizontal sliding movement on studs 2081 and 2082 mounted in the auxiliary frame plate 2083. The slide 2080 carries a stud 2084, which is engaged within a bifurcation in the upper end of an arm 2085 secured to the shaft 282. Hence, the slide is constantly urged toward the front of the machine by the spring 285, but such movement is normally prevented by engagement of the square stud 2078 with the rear end of the notch 2079. Whenever any of the motor bars are depressed, however, the link 2064 and the pressure arm 2071 will be moved down so as to cause the ear 2074 to engage the end of the lever 2075 and move the square stud out of engagement with the notch on the slide, thereby permitting the latter member to be moved toward the front of the machine under the influence of the spring 285. At the same time, the tripping arm 259 will be disengaged from the extension 260 of the clutch control arm, thereby causing the clutch to be engaged and the machine to be given a cycle of operation.

Since it is ordinarily desirable to cause the machine to come to rest at the end of each cycle of operation, even though the motor bar be held depressed by the operator, means is provided for enabling the square stud to re-engage the notch in the control slide when the latter member is restored toward the end of the cycle. It will be noted from Figure 19 that the forward edge of the arm 2085 engages the ear 2074 and will thus cause the pressure arm 2071 to be rocked clockwise against the tension of the spring 2073 when the slide is released for forward movement. This will cause the ear to be moved off the end of the lever 2074, thereby permitting the spring 2077 to urge the square stud into engagement with the lower edge of the slide 2080. Hence, when the slide is restored near the end of the cycle, the square stud will once again engage the notch 2079 and retain the tripping arm 259 in engagement with the extension 260 even though the motor bar be held depressed. When the motor bar is released, the pressure arm will again move to its raised position, and the spring 2073 will cause the ear 2074 to move over the end of the lever 2075, thus restoring the parts to the positions shown in Figure 19.

In order to release the auxiliary slides 2054 from the restraint of the latches 2058 near the end of the machine cycle, the slide 2080 is provided with a pair of latch-releasing fingers 2086, which will engage the studs 2061 on the latches as the slide is restored toward the end of the cycle to thereby disengage the latches and permit the auxiliary slides to be restored to their inactive positions by the springs 2057.

*Amount banks and totalizers*

The present machine is provided with ten denominational rows of amount keys 589 (Figures 15 and 16) for setting up values to be recorded and registered. For each row of amount keys there is an amount actuator rack 617 (Figure 17) mounted for horizontal shifting movement in the machine. Each actuator rack 617 includes an extension rack 907 connected thereto by a link 906, said rack and said extension movable in unison as a single unit. Operatively connected to each actuator rack is a reducer arm segment 913, which is operatively connected to a corresponding printing sector 942. Each reducer arm segment 913 is resiliently connected by a spring 916 to the visual leading frame bar 915 which is rocked first rearwardly or counter-clockwise and then forwardly or clockwise each machine operation in the well-known manner.

The machine is presently equipped with ten add-subtract totalizers, five of which are located above the actuator racks 617 and five below said actuator racks. Each totalizer has a gear wheel 997 (Figure 17) for each denominational order arranged to be engaged with corresponding rack teeth on the upper and lower edges of the actuator racks 617. In adding and subtracting operations, rearward initial movement of the leading frame bar 915, through the springs 916, yieldingly carries the actuator racks 617, the segments 913, and the printing sectors 942 in unison therewith until such movement is terminated by engagement of one of a series of graduated steps on each of said actuator racks with a stud in the stem of the depressed amount key in the corresponding order. This positions the actuator racks and the corresponding printing sectors according to the values of the depressed amount keys, after which operation of the impression mechanism causes said values to be recorded upon record material supported by the platen roll 539 of the traveling carriage.

In adding and subtracting operations, the wheels of the selected totalizers and the actuator racks are engaged and disengaged in proper timing to additively or subtractively enter the values set up on the depressed amount keys therein. Each totalizer wheel is provided with a transfer tripping cam with diametrically-opposed tripping teeth, which cooperate with corresponding add tripping pawls in adding operations and corresponding subtract tripping pawls in subtract operations to transfer tens values from one denomination to the next.

In total and sub-total taking operations, the wheels of the selected totalizer are engaged with the actuator racks prior to their initial movements, which movements reversely rotate said wheels to zero position, which position is determined by the teeth on the corresponding tripping cams contacting the corresponding add tripping pawls, to position said racks and the printing sectors according to the values contained in the selected set of totalizer wheels. Forward or clockwise return movement of the leading frame bar 915 (Figure 17) restores the actuator racks and the printing sectors to home or zero position.

In total-taking operations, the wheels of the selected totalizer are disengaged from the actuator racks prior to their return forward movement, and therefore said wheels remain in a zeroized condition. In sub-total taking operations, the wheels of the selected totalizer remain in engagement with the actuator racks during their forward return movement, which movement restores said wheels to their original condition.

*Totalizer selection*

In the present machine, one of the ten totalizers is reserved for use as an overdraft or "X" totalizer and is used in conjunction with the other nine add-subtract totalizers for transposing the complementary figure of an overdraft to a true negative total.

Figure 16:
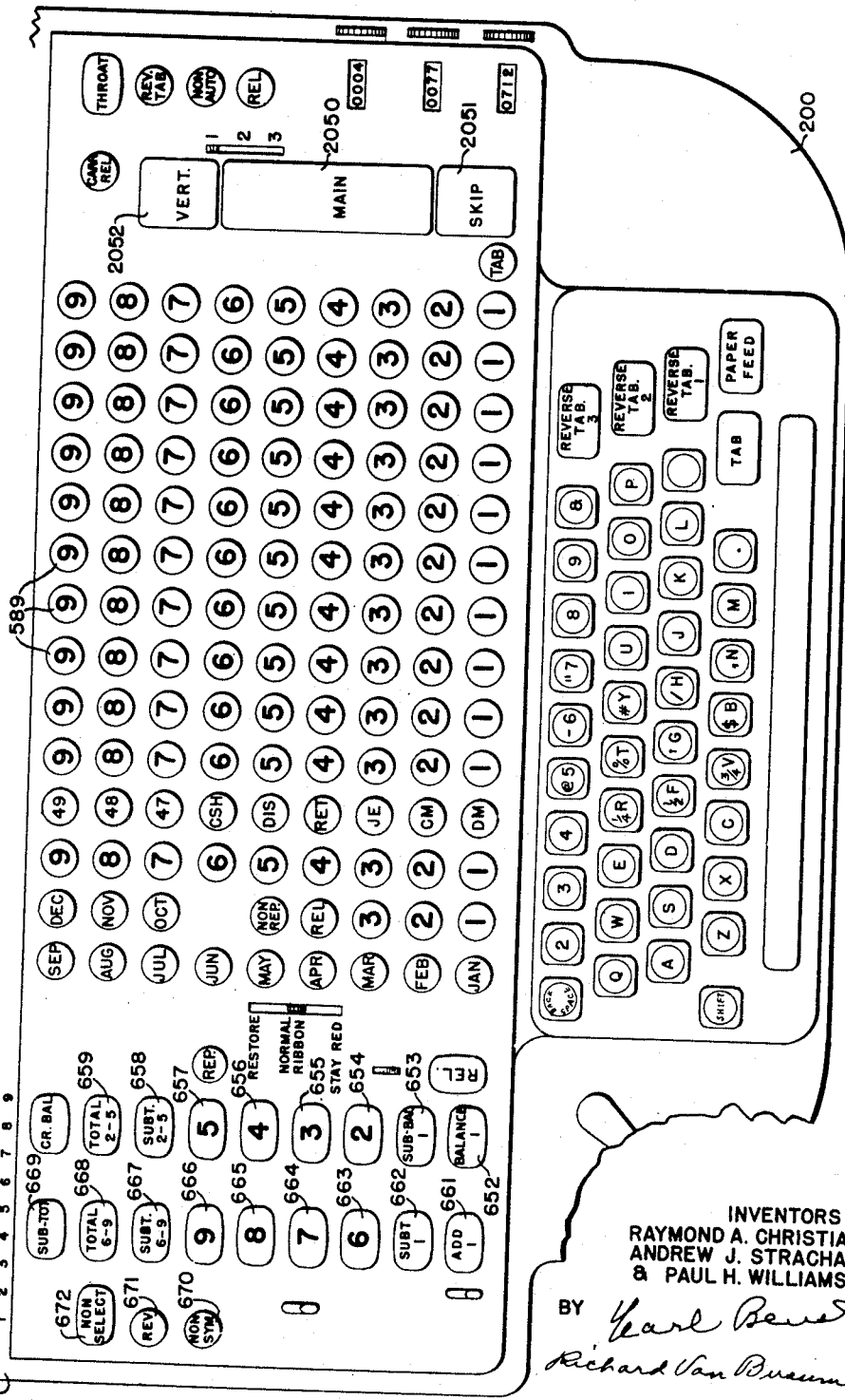
Figure 16 is a plan view of the complete keyboard of the machine disclosed herein.

The No. 1 or balance totalizer is selected for addition, subtraction, balance, and sub-balance operations, respectively, by the use of control keys 661, 662, 652, and 653 (Figures 16 and 15). The Nos. 2 to 9 totalizers inclusive are selected for addition by use of 2–9 keys numbered, respectively, 654–657 and 663–666 inclusive. The 2–5 totalizers are selected and conditioned for subtract and total-taking operations by use of the 2–5 keys 654–657 in combination with their subtract and total control keys 658 and 659. The 6–9 totalizers are selected and conditioned for subtract and total-taking operations by use of the 6–9 keys 663–666 in combination with their subtract and total control keys 667 and 668. The 2–9 totalizers are selected and conditioned for sub-total taking operations by use of the proper 2–9 selecting keys 654–657 or 663–666 in combination with the corresponding total control keys 659 or 668 and a sub-total control key 669 (Figures 16 and 15).

In addition to the control keys described above, the 1–9 totalizers may be selected and conditioned for adding, subtracting, total-taking, and sub-total-taking operations through the medium of the traveling carriage in predetermined columnar positions thereof.

Located beneath the control keys 652—669 is a plurality of totalizer control slides for determining the time of engagement and disengagement of the totalizers and the actuator racks 617. There are eight similar control slides 1051 (Figures 1, 3, 5, and 6) for the 2–9 totalizers inclusive and a control slide 1067 for the No. 1 or balance totalizer, said slides being mounted on bolts 646 secured in the frame 214, for horizontal sliding movement.

The positioning of the No. 1 slide 1067 is controlled by the No. 1 control keys 652, 653, 661, and 662, or by the traveling carriage in predetermined columnar positions thereof, and through its positioning said slide determines the time in which the No. 1 or balance totalizer is engaged with and disengaged from the actuator racks to control the type of operation being performed in said totalizer. In adding operations, the control slides 1051 for totalizers 2–9 are positioned under control of their corresponding 2–9 selecting keys 654–657 and 663–666 to select and condition the corresponding totalizer for addition. In subtracting operations, the control slides 1051 are positioned under control of the 2–9 selecting keys, in combination with the subtract keys 668 and 667 to select and condition the corresponding totalizers for subtracting operations. In total-taking operations, the control slides 1051 are positioned under control of the 2–9 selecting keys in combination with the total control keys 659 and 668 to select and condition the corresponding totalizers for total-taking operations. In sub-total-taking operations, the slides 1051 are positioned under control of the 2–9 selecting keys in combination with the total keys 658 and 667, and the sub-total key 669, to select and condition the corresponding totalizers for sub-total-taking operations. Moreover the slides 1051 for the 2–9 totalizers may be positioned under control of the traveling carriage in preselected columnar positions thereof to select and condition the corresponding totalizers for add, subtract, total-taking, and sub-total-taking operations.

Symbol-printing mechanism

Situated to the right of the amount type sectors 942 are two symbol type sectors 2460 and 2461 (Figures 9, 10, and 15), which are pivotally supported on the upper ends of symbol-printing arms 2462 and 2463, in turn pivotally supported on the printer shaft 945. The means for cocking and firing the symbol type sectors so as to cause printing on the record material is old and well known in the art and therefore needs no description herein. The means for adjusting the symbol type sectors into printing position is likewise similar to that explained in connection with the amount sectors 942 and consists of a pair of links 2464 and 2465, which connect the sectors 2460 and 2461, respectively, with reducer arms 2466 and 2467, rotatably journaled on the reducer arm shaft 914. Associated with each of the reducer arms are a reducer arm segment 2468 and a reducer arm segment 2469, which segments are connected by links 2470 and 2471 to arms 2472 and 2473, respectively, which are secured to the left-hand ends of symbol-printing shafts 2474 and 2475. The links 2470 and 2471 are urged rearwardly by means of springs 2476 (only one shown), which are secured to the reducer arms 2466 and 2467, thereby urging the symbol type sectors into printing position. The symbol-printing shafts extend across the front of the machine below the amount and typewriter keyboards, so as to enable the symbol type sectors to be positioned under the control of the keys located in the control key banks on the left side of the machine.

As illustrated in Figure 11, the positioning of the shaft 2474 is controlled by a pair of slides 2477 and 2478, which cooperate with stops on the "Add 1" key 661 (Figures 1 and 3), the "Subtract 2–5" key 658 and "Subtract 6–9" key 667, the "Reverse" key 671, and the overdraft pitman 2352, so as to cause the type sector 2460 to be differentially positioned to thereby indicate by an appropriate symbol the type of operation being performed. Similarly, the shaft 2475 is positioned under the control of a pair of slides 2479 and 2480, which cooperate with studs on the No. 2–No. 9 totalizer selecting keys so as to cause the type sector 2461 to be differentially positioned to thereby cause an appropriate symbol to be printed to indicate the particular totalizer involved in the transaction.

As shown in Figures 3 and 11, the slide 2480 is provided with four projections 2481, which are adapted to engage the left-hand ends of the studs 1116 when any one of the four keys 663–666 bearing the studs is depressed, thereby differentially positioning the slide and the shaft 2475 so as to cause one of the symbols "6," "7," "8," or "9" (see Figure 10) to be moved into printing position. The shaft and the slide are adapted to be positioned under the influence of the spring 2476 secured to the reducer arm 2467 when the leading frame bar 915 is moved initially toward the rear of the machine in the usual manner, the slide 2480 being coupled to the shaft 2475 by an arm 2482 secured to the shaft and bearing at its upper end a stud 2483, which engages a bifurcation in the lower edge of the slide 2480. The slide is provided at either end with elongated slots which engage the bolts 646 (Figure 1) so as to support the slide for longitudinal sliding movement. The slide 2479 is likewise slidably mounted on the bolts 646 and is provided on its lower edge with a wide notch 2484, within which is located a stud 2485 mounted on the upper end of an arm 2486, which is secured to the shaft 2475. The slide 2479 is provided on its upper edge with four projections 2487, which are adapted to engage corresponding studs 2488 (Figure 3) secured to the right-hand sides of the No. 2–No. 5 totalizer keys 654 to 657 inclusive. Hence, when any one of these four keys is depressed, the stud 2488 thereon will be placed in the path of movement of one of the projections 2487 and so control the positioning of the slide. Accordingly, when the leading frame bar 915 is moved initially toward the rear of the machine during a cycle of operation, the spring 2476 will cause the shaft 2475 to be rotated counter-clockwise, as viewed in Figure 11, and cause the stud 2485 to travel freely within the notch 2484 until it strikes the rear edge thereof and picks up the slide, which is free to move until one of the projections thereon engages a stud 2488. This will stop the symbol type sector 2461 in a position where it will print one of the symbols "2," "3," "4," or "5," engraved thereon.

If none of the No. 2–No. 9 totalizer selection keys are depressed, the shaft 2475 will be prevented from rotating under the influence of the spring 2476 when the machine is cycled by reason of an arm 2489 secured to the shaft and provided at its upper end with a formed-over ear 2490, which engages the end of a finger 2491 formed on the end of an arm 2492 pivoted on the forward bolt 646. The arm 2492 is provided at its upper end with a pin 2493 extending from either side thereof, the left-hand end of the pin being adapted to cooperate with a tail 2494 (Figure 12) formed on the forward end of the slide 719, which is associated with the No. 6–No. 9 totalizer selection keys 663–666. As shown in Figure 13, the right-hand end of the pin 2493 engages a bifurcation provided in the lower edge of a slide 2501, which is provided with slots 2502 engaging over the screws 1112. This slide is urged toward the front of the machine by a spring 2503, so as to normally maintain camming surfaces 2504 in engagement with studs 2505 mounted in the stems of the No. 2–No. 5 totalizer selection keys 654 to 657 inclusive. In a similar manner, the slide 719, shown in Figure 12, is provided with camming surfaces 2506 cooperating with studs 708, 709, 710, and 711, secured to the stems of the No. 6–No. 9 totalizer selection keys 663–666, these surfaces being held in engagement with the studs by the spring 2503 acting through the slide 2501, the pin 2493, and the tail 2494. Hence, when any one of the No. 2–No. 5 or No. 6–No. 9 totalizer selection keys is depressed, the arm 2492 will be rocked counter-clockwise to thereby move the finger 2491 away from the ear 2490 and so "unlock" the symbol-printing shaft 2475 and thereby permit the sector 2461 to be adjusted into printing position under control of the No. 2–No. 5 and No. 6–No. 9 totalizer selection keys.

The symbol type sector 2460 is controlled in a similar manner by slides 2477 and 2478, which are slotted at either end to engage over the bolts 646 (Figure 1). Each of these slides is provided near its forward end with a bifurcation which engages studs 2507 and 2508, which are secured to the upper ends of arms 2509 and 2510, respectively, secured to the shaft 2474. The slide 2477 is provided with projections 2511 and 2512, which are adapted to engage the stud 1239 on the "Subtract 2–5" key 658 and the ear 2351 formed on the upper end of the overdraft pitman 2352, respectively, and thereby control the positioning of the type sector 2460 for the "Subtract" symbol 2513 (Figure 10) or the "Overdraft" symbol 2514. In a similar manner, the slide 2478 is adapted to cooperate with studs 2515 and 2516 secured to the "Reverse" key 671 and the "Subtract 6–9" key 667, respectively, which studs will move into the path of abutment faces 2517 and 2518, respectively, on the slide 2478. In this manner, the type sector 2460 will be adjusted to position to print a "Reverse" symbol 2519 or the "Subtract" symbol 2513, according to which of the two keys is depressed.

The slide 2477 is provided on its right-hand end with an upstanding finger 2533, which is adapted to engage the stud 1068 mounted on the "Add 1" key 661 when the latter is depressed to thereby control the positioning of the symbol type sector 2460 so as to cause an "Add 1" symbol 2534 to be located in printing position.

When the "Non-select" key 672 is depressed, the slides 2477 and 2478 will be released for movement, and, since no stud is positioned by this key to block the travel of the slides, they will move all the way to the rear and thereby cause a "Non-select" symbol 2521 to be positioned at the printing line.

Additional positions of the symbol type sector 2460 are defined by a stop arm 2522 (Figures 4, 5, and 6) secured to the shaft 2474 and bearing a stud 2523, which engages within a slot formed in a selecting arm 2524 loosely pivoted on the forward bolt 646. The latter arm is provided with a finger 2525, on which are formed abutment faces 2526 and 2527, which are adapted to engage square studs on the No. 1 totalizer slide 1067 and the sub-total slide 1190. Thus, in a sub-total-taking operation, instead of being free to move all the way forwardly in the machine, as is normally the case, the sub-total slide 1190 will be stopped in its sub-total-taking position, thereby locating a square stud 2528 in the path of the face 2527 and so causing the symbol type sector 2460 to be positioned with a "Sub-total" symbol 2529 positioned at the printing line. Similarly, when the No. 1 totalizer slide 1067 (Figure 5) moves to its subtract position, a square stud 2530 secured thereto will be located in a position to engage the face 2527 and thereby stop the printing sector 2460 in position to print a "Subtract 1" symbol 2531. If the slide 1067 is permitted to move to its total-taking position, the stud 2530 will then be in a position to engage the face 2526 to thereby stop the type sector in position to print a "Balance 1" symbol 2532.

In connection with the mechanism just described, it should be noted that those symbols which are controlled by studs mounted on the stems of the control keys will not be printed when the control is exercised by a carriage stop instead of by a key, whereas those symbols which are controlled from the totalizer control slides will be printed in either case, since the slides are controlled the same by either the keys or the traveling carriage. The last three mentioned symbols—i. e., the "Sub-total" symbol 2529, the "Subtract 1" symbol 2531, and the "Balance 1" symbol 2532—all fall into the latter category, as does also a "Total" symbol 2535, the printing of which is controlled by lugs 2536 (Figure 6) located on the underneath side of the totalizer control slides 1051. When the control slides 1051 for the No. 2–No. 9 totalizers move to the right, as viewed in Figure 6, to their total-taking positions, the lugs 2536 will be positioned over a bail 2537 (see Figures 2, 7, and 8), which is loosely pivoted on a shaft 2538, which is journaled between the side walls of the bracket 641 (Figure 1). The bail is urged upwardly toward engagement with the lugs 2536 by a spring 2539, which is stretched between a stud secured to the right-hand side arm of the bail and a stud located on the bracket 641. However, the bail is normally held below the path of the lug by a stud 2540 (Figure 8), mounted on the forward end of the slide member 1153, which engages with the lower end of a finger 2541 secured to the right-hand end of a sleeve 2542 (see also Figure 2), which is loosely journaled on the shaft 2538. The sleeve is secured at its left-hand end to the left side arm of the bail 2537, and the bail is thereby prevented by the stud 2540 from moving upwardly into engagement with the lugs until the slide member is released for rearward movement at the appropriate time in the machine cycle by the arm 1157 and the cam 1159. Flexibly connected to the right side arm of the bail 2537 is a blocking finger 2543, which lies in the path of a stud 2544 (Figure 6) mounted on the selecting arm 2524 when the bail is blocked against clockwise movement by one of the lugs 2536. The engagement of the stud with the finger 2543 will cause the symbol type sector 2460 to be located in position to cause the "Total" symbol 2535 to be printed and thereby indicate that a total has been taken from one of the totalizers #2–#9 inclusive. If this is printed under the control of the control keys, the symbol type sector 2461 will be positioned to print the number of the totalizer involved after the "Total" symbol 2535. However, if the total is printed under the control of a stop on the traveling carriage, the "Total" symbol alone will be printed on the record material.

The finger 2543 is flexibly attached to the right side arm of the bail 2537 in order to allow the bail to be restored by the slide member 1153 (Figure 8) slightly earlier in the machine cycle than the selecting arm 2524. It will be noted that the stud 2544 will move over the finger 2543 when the bail 2537 is permitted to move upwardly due to the absence of a lug 2536 and, hence, will lie above the finger at the time the latter is restored upwardly. It is therefore necessary to make the finger flexible so that it can yield at this time and permit the bail to be restored without interference by the stud 2544.

The stop arm 2522 (Figure 4) has formed thereon an ear 2550, which is adapted to cooperate with the end of a finger 2551 formed on a blocking arm 2552, which is secured to the right-hand end of the shaft 2538. This arm is provided with a bifurcation which engages a stud 2553 mounted in the lower edge of a slide 2554, which is provided with elongated apertures in either end thereof by means of which the slide is mounted for sliding movements on the bolts 646.

Secured to the left-hand end of the shaft 2538 is an arm 2555, in the upper end of which is a stud 2556, which engages with a bifurcation in the lower edge of a slide 2557, which, like the slide 2554, is slidably supported at either end on the bolts 646. The slides are resiliently urged toward the front of the machine by a spring 2558 attached to the arm 2552, though they are normally held in the rearward positions, as shown in Figure 4, by a stud 2559 mounted in the lower end of an arm 2560 secured to the shaft 2538, which stud bears against the forward end of the slide member 1153, as shown in Figure 8. With the parts in this position, the finger 2551 lies above the ear 2550 and hence does not block the rotation of the shaft 2474. However, when the machine is operated, the slides 2554 and 2557 are permitted to move forwardly in the machine, the finger 2551 will move down behind the ear 2550 prior to the movement of the leading frame bar 915, and hence the symbol type sector 2460 will be prevented from moving to printing position. The slides are provided with abutments which are adapted to cooperate with studs mounted on the stems of the various control keys so as to prevent forward movement of the slides when the machine is operated. For this purpose, the forward end of the slide 2554 is provided with abutments 2561 and 2562, which lie immediately behind the studs 1083 and 1098, respectively, on the "Subtract 1" and "Balance 1" keys 662 and 652. Hence, when either of these keys is depressed, the slide will be blocked against forward movement, and hence the shaft 2474 will be free to rotate so as to position the type sector 2460. It will be noted that there is no abutment provided for the stud 1194 mounted in the stem of the "Sub-Balance 1" key 653, since, when this key is depressed, the "Balance 1" key is also pulled down so as to move the stud 1098 in front of the abutment 2562. In a similar manner, the stud 1068 on the "Add 1" key 661 will move in front of an abutment 2567 on the forward end of the slide and thereby enable the symbol 2534 to be printed when the machine is operated with this key depressed. As also shown herein, the "Subtract 2–5" key 658 and the "Total 2–5" key 659 are provided with studs 2563 and 2564 (Figures 3 and 4), respectively, which are adapted to move in front of abutments 2565 and 2566 formed on the slide 2554 and thereby permit an appropriate symbol to be printed during the course of these operations. For a similar reason, the overdraft pitman 2352 is provided with a formed-over ear 2568, which is adapted to move down in front of an abutment 2569 on the slide 2554 when the pitman is operated during an overdraft operation, thereby blocking the slide and enabling the "Overdraft" symbol 2514 to be printed on the record material. The slide 2557 is provided near its rear end with a pair of upstanding fingers 2570 and 2571, which are adapted to cooperate with studs 2515, 2516, 2572, and 2573 on the "Reverse" key 671, the "Subtract 6–9" key 667, the "Non-select" key 672, and the "Total 6–9" key 668, respectively, so as to block the slide and thereby prevent the shaft 2474 from being blocked by the finger 2551. As a result, a symbol corresponding to each of these keys will be printed after the amount.

Inasmuch as the slide member 1153 (Figure 8) is restored slightly earlier in the machine cycle than the shaft 2474, which is controlled from the leading frame bar 915, the finger 2551 will be moved from behind the ear 2550 while the spring 2476 (Figure 9) is still urging the link 2470 toward the rear of the machine. Hence, the shaft 2474 and also the symbol type sector 2460 will tend to jump into printing position at this time if means is not provided for preventing this undesirable condition.

One possible form of means for overcoming this difficulty is shown in Figure 14 and comprises a latch 2591 pivoted on a stud 2592 mounted in the auxiliary frame plate 2083. The latch is urged by a spring 2593 to engage a formed-over ear 2594 provided on the upper end of an arm 2595 secured to the right-hand end of the shaft 2474. The latch is normally prevented from engaging with said ear, by a stud 2596 on the lever 2186, which bears against a tail formed on the latch. When the machine is cycled, the lever 2186 is rocked first counter-clockwise to move the stud 2596 off the tail 2597 in the proper timing and so permit the latch to engage with the ear 2594, provided the shaft is being blocked at this time by the finger 2551. If the shaft is not being blocked by the finger, the ear will have taken up a position beneath the latch at the time when the stud 2596 moves off the tail 2597, and consequently the latch will be ineffective to block the shaft. In case the shaft is blocked and the latch is effective, it will restrain the shaft against movement after the finger 2551 moves away from the ear 2550 and will continue to be effective for this purpose until after the leading frame bar 915 has been restored to its home position.

Supplementing the operation of the slides 2554 and 2557 is a bail 2574 (see Figures 2, 5, 7, and 8), which surrounds the bail 2537 and is loosely journaled on the shaft 2538. This bail is provided near the right-hand end with an elevated step 2575, which is adapted to cooperate with a lug 2576 (Figure 5) formed on the lower edge of the #1 totalizer slide 1067 in a manner to be more fully described hereinafter. The left-hand side arm of the bail 2574 is provided with a slot 2577, within which is received a stud 2578 secured to the lower end of a link 2579, which is pivotally connected at its upper end to an arm 2580, which is secured to the shaft 2538. Inasmuch as the forward end of the slot 2577 is formed to follow the arc described by the stud 2578 when the link 2579 is swung about its pivot on the arm 2580, the bail 2574 and the shaft 2538 will be effectively joined together for unitary movement when the stud is in the forward portion of the slot, as shown in Figure 2. As a result, when the #1 totalizer slide 1067 moves to its total-taking position so as to locate the lug 2576 above the step 2575 on the bail, the bail and the shaft 2538 will be prevented from rotating under the influence of the spring 2558, and consequently the finger 2551 will be prevented from moving in front of the ear 2550 to thereby block the movement of the symbol printing shaft 2474. Hence, the "Balance 1" and "Sub-total" symbols 2532 and 2529, respectively, will be free to print when either a balance operation or a sub-balance operation in the #1 totalizer is controlled from a carriage stop. In a similar manner, the "Subtract 1" symbol 2531 may be caused to print when a subtract operation in the #1 totalizer is controlled from a carriage stop by means of an adjustable abutment member 2581 (Figure 5), which is pivotally mounted on a stud 2582 secured to the #1 totalizer slide 1067, which may be held in effective or ineffective position by means of a small clamping screw 2583. When this member is in its effective position, as shown in Figure 5, its rear end will lie above the step 2575 on the bail when the slide 1067 is in its subtract position and thereby prevent the finger 2551 from blocking movement of the symbol printing shaft 2474. If, for some reason, it should be undesirable to print the "Subtract 1" symbol on operations controlled from a carriage stop, as in cases where there are no carbon copies upon which the transactions are to be recorded and the printing of subtract items in red is sufficient to identify them, the member 2581 may be moved to its ineffective position, where its rear end will no longer be in position to block the movement of the bail 2574, thereby causing the symbol printing shaft 2474 to be blocked by the finger 2551. Printing of the "Subtract 1" symbol from the "Subtract 1" control key will still be effective due to the stud moving down in front of the lug 2561 (Figure 4).

As shown in Figure 7, a stud 2584 is secured to the left side arm of the bail 2574 immediately below the edge of the bail 2537, so that, when the latter bail is held down, the bail 2574 will likewise be held down. Thus, when any of the slides 1051 for the totalizers #2–#9 are moved to their total-taking positions, so as to locate the lugs 2536 above the bail 2537, the bail 2574 will likewise be prevented from moving upward during the machine cycle, and the finger 2551 will not be effective to block the rotation of the symbol printing shaft 2474. Hence, the symbol 2535 will be printed on total-taking operations controlled from a carriage stop as well as from operations controlled by keys, so as to indicate that a total has been taken from one of the totalizers #2–#9, inclusive.

"Non-symbol" key

In order to prevent symbols from being printed on operations performed under the control of carriage stops, a "Non-symbol" key 670 has been provided. As shown in Figure 1, this key has a stud 2588 secured in its stem, which cooperates with a bifurcation provided in an arm 2589 pivoted on a stud 2590 secured to the partition plate 633. Pivotally connected to this arm is the upper end of a link 2598, which is connected at its lower end to the stud 2578 secured to the link 2579. Hence, when the "Non-symbol" key is depressed, the link will be drawn upward, thereby swinging the lower end of the link 2579 toward the rear of the machine, so as to move the stud 2578 into the rear portion of the slot 2577, which extends at right angles to the forward end of the slot. The bail 2574 and the shaft 2538 will thereby be permitted to move relatively to each other, so that, although the bail may be prevented by the #1 totalizer slide 1067 or by the bail 2537 from moving upward when the machine is cycled, the shaft and the finger 2551 will not be blocked and will be able to move into effective position to block the operation of the symbol printing shaft 2474. Thus, symbol printing will be prevented on all operations controlled by the carriage stops, although the printing of symbols under the control of the control keys will remain effective.

While the form of mechanism herein shown and described is admirably adapted to fulfill the objects primarily stated, it is to be understood that it is not intended that the invention shall be confined to the particular embodiment disclosed herein but rather that it shall extend to all structures employing the principles taught herein.

What is claimed is:

1. In a machine of the class described, having means for giving the machine cycles of operation, the combination of a type carrier yieldably movable from a non-printing position to any one of a plurality of printing positions; a plurality of depressible control keys effective when depressed to control the positioning of the type carrier in one of its plurality of printing positions; means for preventing movement of the type carrier from said non-printing position, said means being normally located in an ineffective position but movable from said ineffective position to an effective position; means for urging said preventing means to move from said ineffective position to said effective position on each cycle of operation of the machine and prior to the movement of the type carrier from said non-printing position; and means operatively connected to the urging means and operating to sense the presence of a depressed control key and effective when one of said control keys is depressed to cause said preventing means to be retained in its ineffective position when the machine is cycled to enable the type carrier to be positioned in one of its printing positions by said depressed control key.

2. In a machine of the class described, having means for giving the machine cycles of operation, the combination of a type carrier movable from a non-printing position to any one of a plurality of printing positions; means for preventing said type carrier from moving from said non-printing position, said preventing means normally in ineffective position; means for urging the preventing means to move from said ineffective position to an effective position on each cycle of operation of the machine and prior to movement of said type carrier from said non-printing position; a control part; means to connect the control part to the preventing means; a positionable function control member coacting with the part when said member is moved to certain positions to cause the preventing means to be retained in ineffective position; and manually-operable means for disabling the connecting means to cause the preventing means to move to its effective position to prevent the type carrier from moving from said non-printing position regardless of the position of the positionable member.

3. In a machine of the class described, the combination of means for giving the machine cycles of operation; a type carrier movable from a non-printing position to any one of a plurality of printing positions; means operable on each cycle of operation of the machine for yieldably urging said type carrier to move from its said non-printing position to one of its said printing positions; means for blocking the movement of said type carrier from said non-printing position, said means normally in an ineffective position, but movable to an effective position; means for yieldably urging said blocking means to move from said ineffective position to said effective position on each cycle of operation of the machine and prior to the movement of said type carrier from said non-printing position; a plurality of positionable control members; means controlled by said control members, when moved to certain positions, for preventing movement of said blocking means to its effective position; and a manipulative member for disabling said preventing means so as to enable said blocking means to move to its effective position to block the movement of said type carrier.

4. In a machine of the class described having means for giving the machine cycles of operation, a traveling carriage, a plurality of function-controlling keys, and a plurality of function-determining elements positionable under the control of the traveling carriage or the control keys, the combination of a type carrier provided with a plurality of symbol characters for identifying the various operations performed by the machine, said type carrier being movable from a non-printing position to any one of a plurality of printing positions; means normally effective to retain said type carrier in non-printing position; means controlled by the control keys for rendering said retaining means ineffective, when one of said keys has been depressed; means controlled by the function-determining elements for rendering said retaining means ineffective upon movement of one or more of said elements to a predetermined position; and manually operated means for disabling said last means so as to enable said retaining means to remain effective to retain the type carrier in its non-printing position regardless of whether or not one or more of the elements have been moved to said predetermined positions.

5. In a machine of the class described, constructed and arranged to print records on record material and having a traveling carriage to support the record material, and a plurality of control elements, the combination of a symbol printing sector; means including a shaft to position the sector; means to obstruct positioning movement of the shaft; means normally effective to retain the obstructing means in ineffective position, but operable to move the obstructing means to obstructing position at the beginning of each machine operation; means controlled by the elements to render the obstructing means ineffective during machine operation; means controlled by the traveling carriage to render the obstructing means ineffective during machine operation; and means to disable the latter rendering means to enable the obstructing means to be effective in all operations controlled by the traveling carriage and ineffective in all operations controlled by the elements.

6. In a machine of the class described, constructed and arranged to print records on record material and having a traveling carriage for supporting the record material and a plurality of control keys, the combination of a printing sector for printing function-identifying characters on the record material; means including a shaft to position the printing sector; a plurality of function-controlling slides positionable under control of the traveling carriage or the control keys; means operatively connected to the shaft and coacting with the slides to position said shaft and the printing sector according to the positioning of said slides; normally ineffective means to obstruct positioning movement of the shaft; means operating at the beginning of each machine operation to yieldingly move the obstructing means from ineffective to effective position; means intermediate the control keys and the obstructing means to retain said obstructing means in ineffective position when said control keys are effective; means controlled by the slides, when in certain predetermined positions, to retain the obstructing means in ineffective position; and means to render the latter retaining means ineffective whereby the slides, when positioned by the traveling carriage, will be ineffective to control the positioning of the shaft and the printing sector.

7. In a machine of the character described, constructed and arranged to print records on record material and having a traveling carriage to support the record material, and a plurality of depressible function-controlling keys, the combination of a plurality of slides positionable under control of the traveling carriage or the control keys for determining the functions to be performed by the machine; a type carrier movable from a non-printing to any one of a series of printing positions to print characters on the record material to identify the functions performed by the machine; a shaft operatively connected to the type carrier; means controlled by the slides in predetermined positions thereof for positioning the shaft and the type carrier accordingly; normally effective means for obstructing positioning movement of the shaft and the type carrier; means controlled by the slides for rendering the obstructing means ineffective; and manually operated means for disabling the rendering means to cause the obstructing means to be effective at all times.

8. In a machine of the class described, constructed and arranged to print records on record material, and having a traveling carriage to support the record material, and a plurality of operation-controlling keys, the combination of a plurality of slides positionable under control of the traveling carriage or the keys for determining the type of operation to be performed by the machine; a type carrier for printing symbols on the record material to identify the type of operation being performed by the machine; a shaft operatively connected to the type carrier; means controlled by the slides for positioning the shaft and the type carrier according to the type of operation being performed; means for obstructing positioning movement of the shaft and the type carrier; operating means effective at the beginning of a machine operation for yieldingly moving the obstructing means from an ineffective position to an effective position to obstruct positioning movement of the shaft and the type carrier; means releasably connected to the obstructing means and controlled by the slides to prevent movement of said obstructing means to effective position; and manually operable means to release the last named means, to separate the obstructing means from the control of the slides.

9. In a machine of the class described, constructed and arranged to print records on record material, and having a traveling carriage to support the record material, and a plurality of control keys, the combination of a plurality of slides constructed and arranged to be positioned by the traveling carriage or the control keys for determining the type of machine operation to be performed; a type carrier movable from a non-printing to any one of a series of printing positions to print symbols to identify the type of machine operation being performed; means including a shaft to position the type carrier; means operatively connected to the shaft and coacting with the slides to position said shaft and the type carrier according to the position of said slides; a second shaft; means on the second shaft to obstruct movement of the first shaft and the type carrier from non-printing position; operating means for yieldably moving the second shaft and the obstructing means from an ineffective position to an effective or obstructing position prior to positioning movement of the first shaft and the type carrier; means including a member releasably connected to the second shaft and coacting with the slides to retain said second shaft and the obstructing means in ineffective position when said slides are positioned under control of the control keys or the traveling carriage; and means to disconnect the member from the second shaft to free the second shaft and the obstructing means from the control of the slides.

10. In a machine of the class described, constructed and arranged to print records on record material and having a traveling carriage to support the record material, and a plurality of depressible control keys, the combination of a plurality of slides adapted to be positioned by the traveling carriage or the depressed control keys in various predetermined positions to control the type of machine operation to be performed; a type carrier for printing symbols to identify the type of machine operation being performed; means including a shaft to position the type carrier; means operatively connected to the shaft and coacting with the slides to position said shaft; means on the second shaft to obstruct the positioning movement of the first shaft and the type carrier; operating means for yieldably carrying the second shaft and the obstructing means from an ineffective position to an effective position; means controlled by the control keys to retain the second shaft and the obstructing means in ineffective position; means including a member releasably connected to the second shaft and controlled by the slides when said slides are positioned under control of the traveling carriage to retain said shaft and the obstructing means in ineffective position; and means to release the member from the second shaft to enable the obstructing means to be moved to effective position when the slides are positioned under control of the traveling carriage.

11. In a machine of the class described, constructed and arranged to print records on record material and having a traveling carriage for supporting said record material, the combination of a plurality of slides constructed and arranged to be positioned by the traveling carriage to determine the type of machine operation to be performed; a type carrier for printing symbols on the record material to identify the type of machine operation performed; means including a shaft to position the type carrier; means to yieldingly lead the shaft and the type carrier from a home or normal position in a positioning direction and return; an element on the shaft; means coacting with the element to obstruct positioning movement of the shaft and the type carrier; means to yieldingly lead the obstructing means from an ineffective position into the path of the element and return; sensing means releasably connected to the obstructing means for sensing the slides to control the movement of said obstructing means into the path of the element; and manually operable means to release the sensing means from the obstructing means to enable said obstructing means to move into the path of the element to prevent the printing of symbols.

12. In a machine of the class described, constructed and arranged to print records on record material and having a traveling carriage to support said record material and a plurality of depressible control keys, the combination of a plurality of control slides positionable under control of the traveling carriage or the depressed control keys for determining the type of operation to be performed; a type carrier for printing symbols on the record material to identify the type of operation being performed; means including a shaft for moving said type carrier from a non-printing position to any one of several symbol printing positions; means operable during each machine operation to yieldingly lead the shaft and the type carrier from said non-printing position to any one of said symbol printing positions; a member on the shaft; means coacting with the member and the slides to position the shaft and the type carrier according to the position of said slides; a second shaft; an obstructing element on the second shaft; means operable during each machine operation to yieldingly carry said second shaft and said obstructing element from an ineffective position to an effective position where said obstructing element coacts with the member to obstruct movement of the first shaft and the type carrier from its non-printing position; means intermediate the control keys and the obstructing element and effective when said control keys are depressed to retain the second shaft and said obstructing element in ineffective position; means to sense the slides after they have been positioned; releasable means to connect the sensing means to the second shaft to cause said sensing means to control the effectiveness of the obstructing element; and manually operable means to release the releasable means to disconnect the sensing means from the second shaft to free the obstructing element for movement to effective position, in operation in which the control slides are positioned under the control of the traveling carriage.

RAYMOND A. CHRISTIAN.
  ANDREW J. STRACHAN.
  PAUL H. WILLIAMS.

References Cited in the file of this patent

UNITED STATES PATENTS

| Number | Name | Date |
|---|---|---|
| 1,599,634 | Bernau | Sept. 14, 1926 |
| 1,946,505 | Sundstrand | Feb. 13, 1934 |
| 2,468,408 | Racz | Apr. 26, 1949 |